US006821032B2

(12) United States Patent
Lake et al.

(10) Patent No.: US 6,821,032 B2
(45) Date of Patent: Nov. 23, 2004

(54) METHODS OF SEALING ELECTRONIC, OPTICAL AND ELECTRO-OPTICAL PACKAGES AND RELATED PACKAGE AND SUBSTRATE DESIGNS

(75) Inventors: Rickie C. Lake, Sunnyvale, CA (US); Xiaowei Yao, Fremont, CA (US); Charles E. Askew, Mountain View, CA (US); Marc Epitaux, Sunnyvale, CA (US); Marc A. Finot, Palo Alto, CA (US); Jeffrey A. Bennett, Sunnyvale, CA (US); Robert M. Kohler, Mountain View, CA (US); Jean-Marc Verdiell, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 10/156,435

(22) Filed: May 28, 2002

(65) Prior Publication Data

US 2003/0223709 A1 Dec. 4, 2003

(51) Int. Cl.[7] .................................................. G02B 6/42
(52) U.S. Cl. .......................................... 385/94; 385/92
(58) Field of Search ....................................... 385/88–94

(56) References Cited

U.S. PATENT DOCUMENTS

| 3,647,534 A | * | 3/1972 | Rice, Jr. ..................... 427/98 |
| 4,647,148 A | | 3/1987 | Katagiri |
| 5,058,265 A | | 10/1991 | Goldfarb |
| 5,311,402 A | * | 5/1994 | Kobayashi et al. ......... 361/760 |
| 5,786,548 A | | 7/1998 | Fanucchi et al. |
| 6,207,950 B1 | * | 3/2001 | Verdiell ...................... 250/239 |
| 6,296,336 B1 | | 10/2001 | Hattori |

FOREIGN PATENT DOCUMENTS

| EP | 0381370 A2 | 8/1990 |
| WO | WO 00/42464 | 7/2000 |

OTHER PUBLICATIONS

International Search Report of the European Patent Office dated Sep. 8, 2003 (7 pages).
Selected pages of Kyocera online catalog, available at http://www.kyocera.co.jp/frame/product/semicon/oe_pkg/btf_pkg.html, concerning Kyocera multilayer ceramic butterfly type packages for optical telecommunication uses.

* cited by examiner

Primary Examiner—John D. Lee
Assistant Examiner—Sarah U. Song
(74) Attorney, Agent, or Firm—Marshall, Gerstein & Borun LLP

(57) ABSTRACT

A low profile ringframe used in electro-optical module packaging is disclosed. The ringframe can be mounted so as to be set back from, be flush with, or be extending exteriorly over the outer end wall of the ceramic substrate, and may also be formed so as to help physically separate the ringframe-to-subtrate solder joint from the ringframe-to-laser weld seam. The ringframe, along the side where it is sealed to the adjacent substrate, can be notched with one or more cutout areas to allow a space for wicking of reflowed solder to prevent a built-up solder fillet from forming exteriorly of the ringframe.

29 Claims, 4 Drawing Sheets

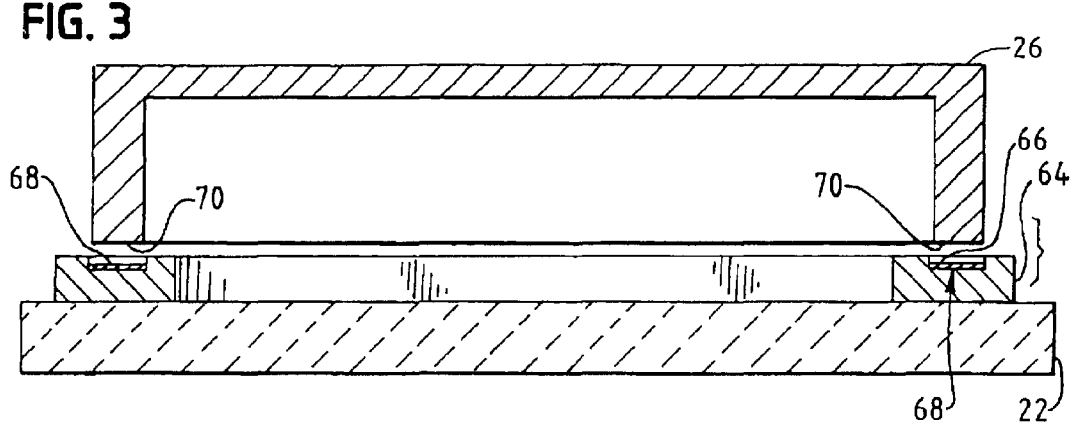
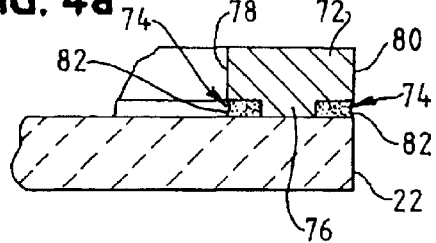
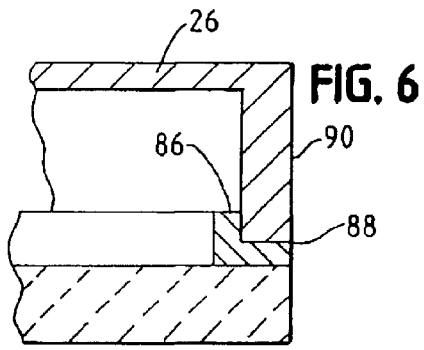
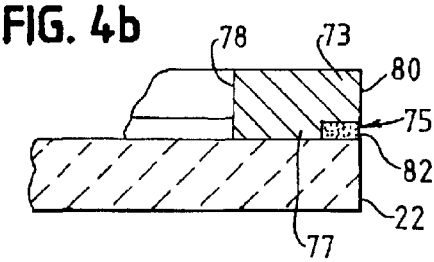
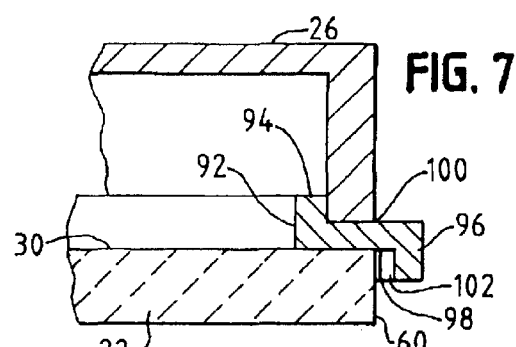
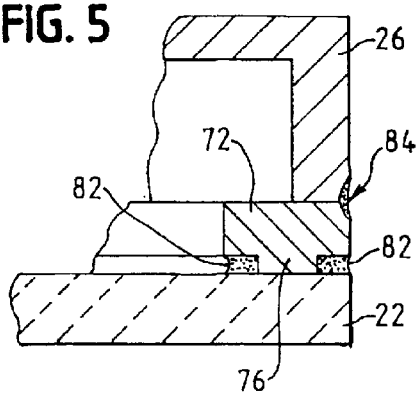
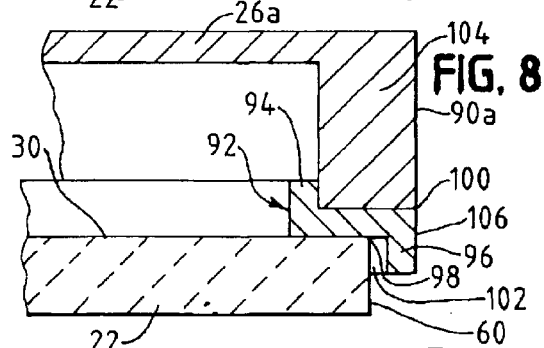
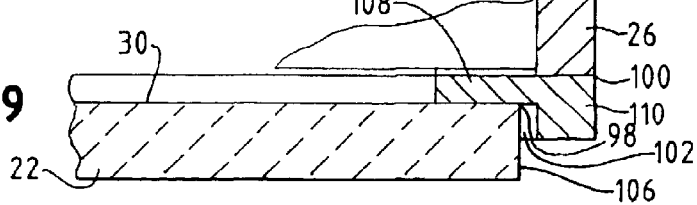

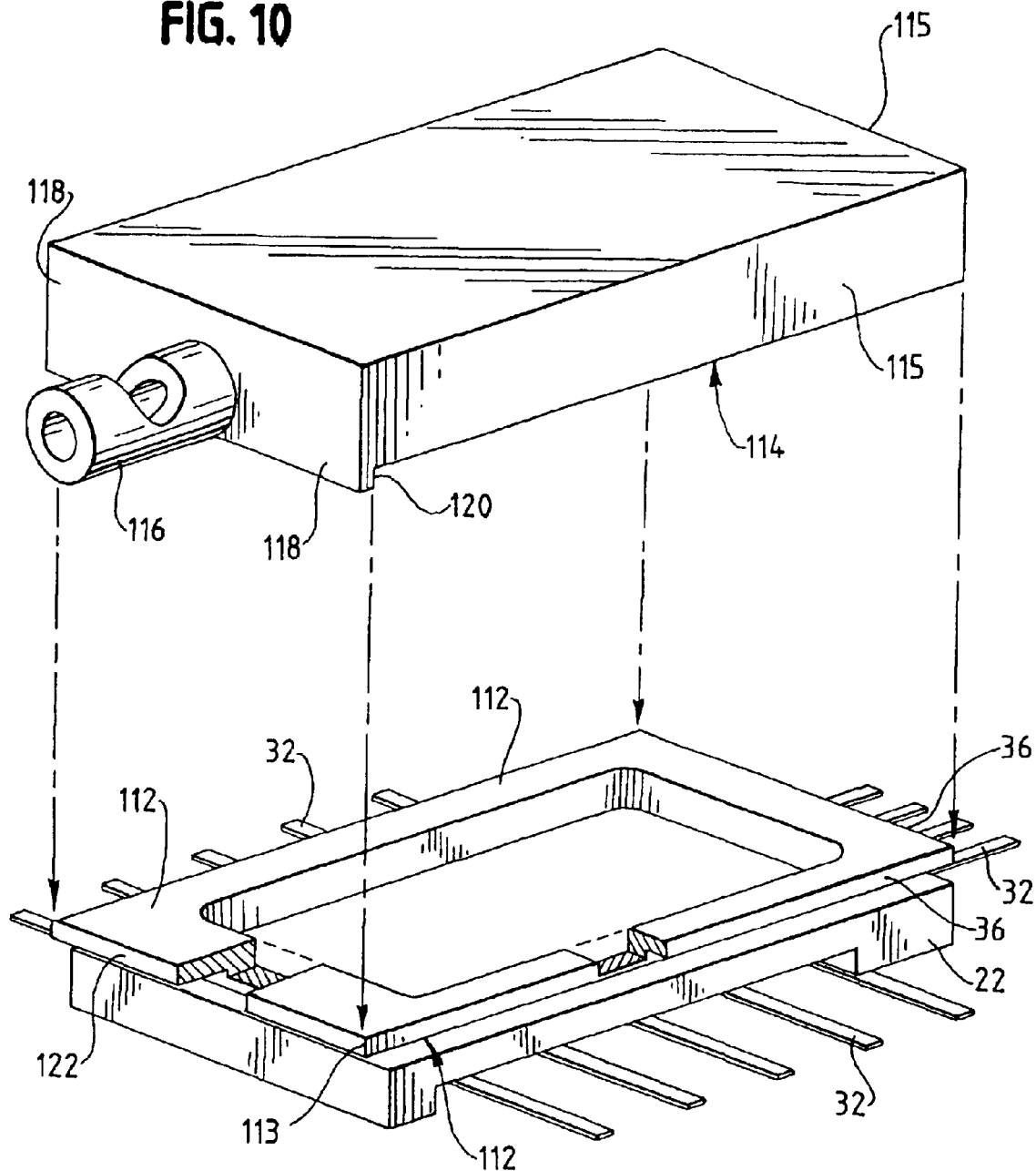

METHODS OF SEALING ELECTRONIC, OPTICAL AND ELECTRO-OPTICAL PACKAGES AND RELATED PACKAGE AND SUBSTRATE DESIGNS

FIELD OF THE INVENTION

This invention relates to welding and sealing of electronic and/or optical packages, such as electro-optical modules utilized in transponders for use in optical telecommunication transmisions, and to weld joint and seal joint designs for such packages.

BACKGROUND OF THE INVENTION

Standard optical module packaging, such as in optical telecommunication applications, is used for an hermetic enclosure, after the alignment of the end of an optical fiber component with a related optical laser component. Such packaging is also used to house any associated lens and/or heat sink apparatus. Such optical telecommunication uses can include packaging of uncooled laser diodes, photo diodes, low power pump laser diodes, and lens integration with diodes. These standard packages primarily involve large so-called "butterfly" packages. Butterfly packages are essentially can-and-cover type arrangements that contain a separate optical module. That optical module may be built up separately, outside of the can, and then later installed into the can which is then covered off to create the hermetic seal. Alternatively, the optical module can be built up while inside of the can, but that is accomplished with great difficulty. Such modules, whether built up separately outside of the can and later installed, or while built up inside of the can, require a separate ceramic substrate, i.e., a base platform upon which all the optical-related components are mounted. Not only does the optical module include its own ceramic substrate, but then the can itself includes a separate base, on which the built up module is mounted. Thus, extra expensive components are required. Also, such butterfly type packages are quite tall (i.e., thick) because of their multilayer construction. This can result, in turn, in a relatively thick transponder unit.

Typically, because of the significant height of the side walls in such butterfly can constructions, the critical alignment of the metalized end of the optical fiber with the mating laser diode (whether a receiving or transmitting diode), is accomplished outside of the can. This is because, if such critical alignment is attempted inside the can, it is quite difficult to ensure that such alignment is accurately achieved, especially in the vertical direction which is hard to judge and measure inside the deep can's enclosure.

Such butterfly packages have long been the standard format for optical telecommunication transmission and pump laser diode modules. While satisfactory, for the most part, in operation, they are relatively too large, i.e., tall, significantly expensive, and require excessive components.

Separately, so-called ringframes are sometimes used to create optical packages. Ringframes are metal rings of a given profile that are brazed, i.e., soldered, onto metalized ceramic substrates. However, they have also proven deficient by preventing viewing from the side of the so-called "optical plane", i.e., the horizontal plane relative to the ceramic substrate in which the incoming optical fiber end is aligned with the mating laser diode.

Hermetic sealing of such ringframe-type optical transmission modules is very important, where laser welding and seal joint soldering of such modules is used. However, because of the small dimensions inherent with such modules, there is a continuing problem with either improper seals and welds, or contamination of a prior solder joint by a later laser weld operation. Any of such problems can cause rejection of the almost-finished part for its intended end use in an optical telecommunication application. There have also been problems with side-viewing of the optical plane with such prior ringframe uses.

Further, there have been assembly problems present when having the so-called "fiber feedthrough" member, i.e., an extension channel or trough through which the optical fiber is inserted internally into the module and then later hermetically-sealed, mounted to the unit's cover. That is, it is difficult to properly slip the delicate optical fiber through the cover's feedthrough while simultaneously maneuvering the cover into position on the can of a butterfly package for the final hermetic cover seal. Also, having such a fiber feedthrough mounted to the cover, particularly low on the cover's side wall, present significant obstacles to proper laser seam welding.

Yet further problems with such butterfly packages and prior attempts at the use of ringframe constructions concerned solder joints, where large solder fillets are caused to occur on the outside of the can or ringframe during soldering operations. This can be a problem with both the associated laser weld (of the cover to the ringframe), and also cause undersirable extra "additive" width, i.e., which such a solder fillet presents to the overall width of the optical module.

BRIEF DESCRIPTION OF THE DRAWINGS

The means by which the present invention is constructed and operates, so as to overcome the above-noted deficiencies of the prior art, will be readily understood from the following specification upon reference to the accompanying drawings, in which:

FIG. 3 is an exploded assembly elevation view in section of another ringframe module of the present invention;

FIG. 4a and 4b are respective partial section view of a modified form of ringframe, similar to FIG. 2b, with additional cutout structure, and as attached to a substrate;

FIG. 5 is another partial section view similar to FIG. 4, with the addition of a cover welded in place atop the cutout-type ringframe;

FIG. 6 is a partial section view of a L-shaped ringframe with flush-mounted cover;

FIG. 7 is a partial section view of a Z-shaped ring frame with cover attached;

FIG. 8 is a partial section view of yet another Z-shaped ringframe, similar to the ringframe of FIG. 7, but with an alternate flush cover shape;

FIG. 9 is a section view of a reverse L-shaped ringframe with flush cover attached;

FIG. 10 is an exploded assembly view in perspective of a substrate, an extended-type ringframe (similar to FIG. 2c), and cover with fiber feedthrough.

DETAILED DESCRIPTION OF THE INVENTION

Figure 1:
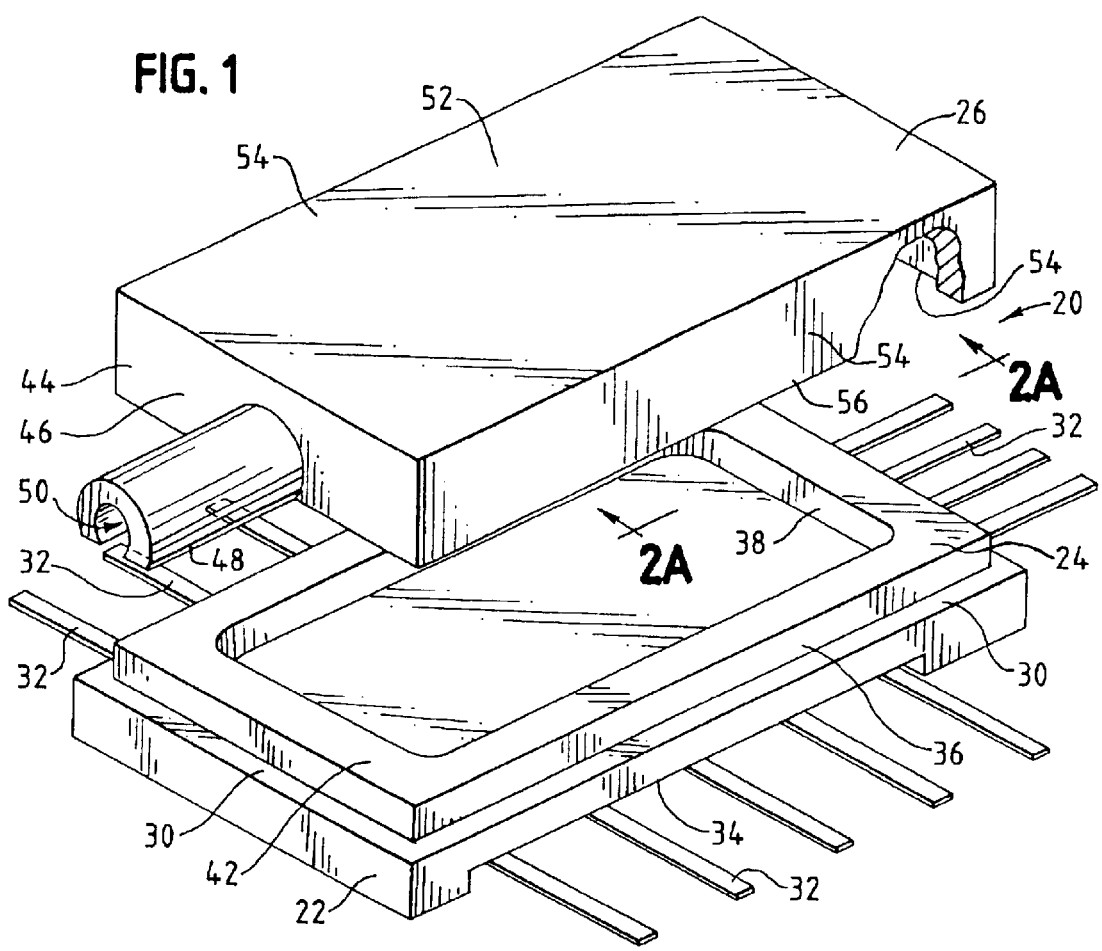
FIG. 1 is an exploded assembly view in perspective of one form of a ringframe module package of the present invention.

Having reference to the drawings, wherein like reference numerals indicate corresponding elements, there is shown in FIG. 1 an illustration of a low profile ringframe module package of the present invention, generally denoted by reference numeral 20. Module package 20 includes a base or ceramic substrate 22, a low profile ringframe 24, and a cover member 26. As used in optical telecommunications applications, the ceramic substrate 22 has an appropriately patterned circuitry (not shown) formed on its upper metalized surface 30. Electrical leads 32 are fastened, such as by soldering, to the lower notched surface 34 of ceramic substrate 22, and are connected through appropriate openings (not shown) to the patterned circuitry 28 on surface 30. It will be noted that the bottom wall 34 of substrate 22 is notched to permit the leads 32 to come into the side of the substrate, so that the leads' thickness does not become an additive thickness to the overall module package's height.

As seen in FIG. 1, the ringframe 24, in this particular arrangement, has a generally rectangular cross-sectional configuration as formed between outer wall 36 and inner wall 38, and a lower planar surface 40 which rests upon upper planar surface 30 of substrate 22. Further, ringframe 24 has an upper planar surface 42 upon which the cover 26 is seated and hermetically sealed. The outer wall 36 of ringframe 24 is purposely set back from the outer edge of substrate 22. The ringframe 24, and other ringframe designs later described herein, are preferably formed of so-called KOVAR®, i.e., a metallic material.

The cover 26 of the ringframe module 20, see FIG. 1, is seen to have a top plate 52 and downwardly-extending side walls 54 formed along four side portions thereof. Generally at the center along the outer surface 46 of one end wall 54 is formed a horizontally outwardly extending so-called "fiber feedthrough" 48, which in this particular configuration has a downturned optical fiber receiving opening 50 which extends through that end wall 54 to the interior of the ringframe 24. The respective side walls 54 have at their lower edge a planar surface 56 for mating and being sealably fastened to the planar upper surface 42 of ringframe 24.

Figure 2A:
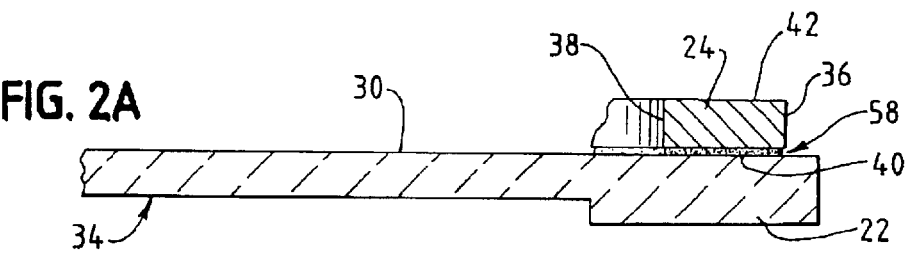
FIG. 2a is a side elevation partial section view of the substrate and ringframe components of the package of FIG. 1.

Turning to FIG. 2a, it is seen how the ringframe 24 of FIG. 1 is sealably fastened, by soldering, onto the upper metalized surface 30 of ceramic substrate 22. That is, a very thin solder layer 58 (having exaggerated thickness in FIG. 2a for better viewing) is formed between the lower surface 40 of ringframe 24 and surface 30. As seen there, the ringframe 24 becomes, in effect, a low profile side wall mounted atop substrate 22 for the overall module 20. That is, ringframe 24 is of substantially reduced height as compared to the side walls of the prior "can and cover" butterfly and ringframe packages. Use of such a low profile ringframe allows for easy so-called "population", i.e., building up, of electrical/optical components onto the ceramic substrate 22, without the constraints of significantly high side walls of prior butterfly and ringframe packages. It also allows for easy side viewing, by computer aid, of the optical plane which is formed by the related optical components that eventually populate module 20 above the ringframe's side walls.

As will be described more filly later, a simple deep drawn or machined metal cover component, preferably formed of KOVAR® or other suitable metal, can then be used to be laser welded to, and cover off, the ringframe 24 to contain and fully enclose the populated components on the substrate 22, so as to hermetically seal off the module package 20. Use of such an hermetically sealed cover acts to keep out moisture, corrosion, and ambient air, to therefore protect the generally temperamental and delicate electro-optical components mounted inside the module, e.g., a laser diode. This acts to prevent loss of power for the resulting optical module over its expected 20-year plus life span. More importantly, use of a low profile ringframe allows side viewing, for alignment purposes, of the end of the optical fiber (see fiber 142 in FIG. 11) to the associated photo diode (shown as part of components 136 in FIG. 11, for example) before the two are securely fastened in place. Thus, such a low ringframe design permits and facilitates easy viewing (preferably by a computer-guided camera view from overhead and from the side), all to assure proper and permanent optical alignment of the fiber end and diode.

Figure 2B:
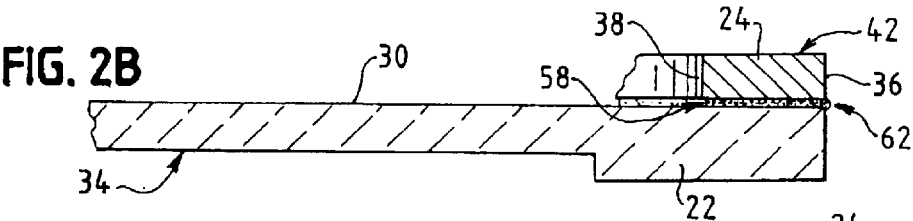
FIGS. 2b and 2c are also side elevation partial section views, similar to FIG. 2a, but of modified arrangements of the ringframe and substrate.

In FIG. 2b is shown a slightly modified orientation for the ringframe 24, i.e., positioned relative to substrate 22 so that outer ringframe wall 36 is flush with the outer edge wall 60 of substrate 22. In many applications, such a flush alignment (of the outer surface 36 of ringframe 24 to the outer surface 60 of ceramic substrate 22) is preferred over the interiorly-positioned ringframe arrangement of FIG. 2a. Depending, however, on the quality and amount of the solder joint 58 between the ringframe 24 and substrate 22, there may be a solder fillet 62 formed and present at the outer flush edge (of the positioning arrangement shown in FIG. 2b). It will be understood that such a solder joint fillet 62 can present problems when the subsequent laser weld of the lower edge of cover 26 is formed along the upper planar surface 42 of ringframe 24.

Figure 2C:
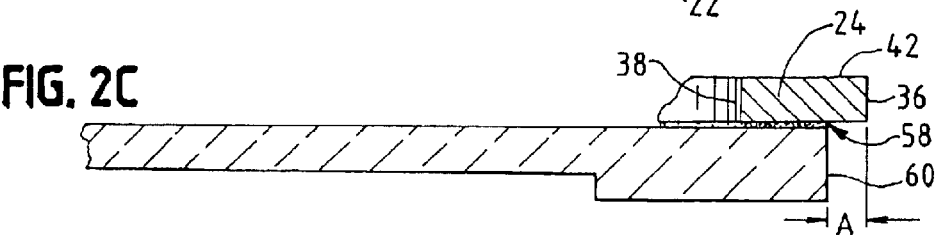

Turning to FIG. 2C, there is shown yet a further modified mounting arrangement for the ringframe 24 relative to the ceramic substrate 22. As shown there, an outer portion of ringframe 24, including outer wall 36, extends out beyond the outer surface 60 of substrate 22, by an extension distance represented by reference letter A. This extended ringframe arrangement is useful in those situations where there is not a concern about the additive width of such a ringframe extension, and instead, it is more important that the solder fillet 62 be located, i.e, segregated, at a distant point relative to where the subsequent laser weld of the cover (not shown in FIG. 2c but see cover 26 in FIGS. 1 and 2A) and upper surface 42 of ringframe 24 will occur. This ringframe extension over the side of substrate 22 can occur, as a given end user application may require, out over one, two, three or even all four side edges of the substrate 22.

FIG. 3 depicts a slightly modified version of the ringframe mounting configuration depicted in FIG. 2a. There, the ringframe 64 is shown as specially configured, i.e., with an upper central notch area along its entire length. That is, ringframe 64 is similar to ringframe 24, except it includes the addition of an upwardly opening etched channel 66 which is used for positively and quickly locating the cover 26. This channel-type ringframe 64, otherwise similar to channel 24 in FIG. 2a, is also brazed, i.e., soldered, onto to the upper metalized surface 30 of ceramic substrate 22. A solder preform 68 is then laid into the bottom of etched channel 66, whereupon, after that module has been populated with the desired components (not shown), the lower peripheral edge 70 of the cover 26 is ready to be hermetically sealed to the etched channel 66 of ringframe 64. That is, the lower cover edge 70 is positioned within the confines of the etched channels 66, and against the solder preform 68.

Then, through appropriate use of a brazing heat operation, the cover 26 is hermetically sealed to the ringframe/substrate combination, so as to close off the interior of that electronic module. It will be seen that the etched channel 66 provides for the positive location of the cover 26 relative to the channeled ring frame 64 and assists in expediting assembly of the electronic module. Instead of using a solder preform 68 one could utilize a low-melting, i.e., low softening point, sealing glass material to hermetically seal the edge 70 of cover 26 to ringframe 64.

Turning to FIG. 4a, there is shown a specially configured cutout-type ringframe 72, having two lower cutout areas 74 which form between them a downwardly-extending ringframe nose portion 76. More specifically, the cutouts 74 can be formed on cutout ring frame 72 by chemically etching the respective outer lower corner portions of the ringframe 72. This specially configured cutout ringframe 72 is useful to prevent any unwanted build up, i.e., fillet, of solder from forming which can extend, respectively, beyond the inner surface 78 and outer surface 80 of cutout ringframe 72. That is, due to the presence of the cutout areas 74, the reflowed solder brazing material 82 is free to instead flow along each respective cutout 74. Therefore, the reflowed solder does not undesirably wet or wick up onto and out along the other surfaces of the ringframe 72 and substrate 22. Instead, the reflowed brazing material is caused to stay within the confines of the cutouts 74, rather than extending out beyond respective surfaces 78, 80 of ringframe 72. This fillet control feature has the advantage of keeping the subsequent laser beam (used to weld and hermetically seal the cover 26 to the ringframe 72) from contacting the ringframe's brazed joint (formed by brazing material 82 in FIG. 4a) during the later laser welding operation of the cover.

There is shown in FIG. 4B another cutout ringframe design 73, otherwise similar to that of FIG. 4a, but where there is only one cutout 75 formed at the outer lower corner on cutout ringframe 73, and the resulting lower nose portion 77. This particular ringframe design provides the preferred embodiment of the present invention's ringframe-to-substrate braze joint.

As also seen in FIG. 5, that laser beam weld joint 84 is confined to the associated areas of cover 26, and the upper outer edge area of cutout ringframe 72, but does not extend down into, and thus potentially corrupt or otherwise contact, the solder brazing material 82 at the solder braze joint of the ringframe 72 with the ceramic substrate 22. Further, by having the etched notch formed by the cutout 74 (or cutout 75 in the preferred embodiment of FIG. 4b) on the exterior of the module, you can visibly see the solder seal during a visual inspection of the substrate/ringframe unit, i.e., you can see totally around the part to make sure that it is a good solder joint and hermetic seal.

FIG. 6 shows a yet further modified version of the low profile ringframe of the present invention, namely an L-shaped ringframe 84 having an upstanding inner ringframe lip 86 which is useful to positively locate the lower edge 70 of cover 26. Here again, in this arrangement, the outer wall 60 of substrate 22 is formed flush with the outer wall 88 of L-shaped ringframe 84, which is in turn formed flush with the outer surface 90 of cover 26. As seen in FIG. 6, this L-shaped ringframe 84 permits positive locating of the cover 26 relative to ringframe 84 to assist with expedited assembly.

FIG. 7 shows another modified version of the present ringframe, here namely a generally Z-shaped ringframe 92. That is, Z-shaped ringframe 92 includes both an upper inner ringframe lip 94 at the inner end and a downturned outer ringframe lip 96 at the outer end. This specific Z-shaped ringframe 92 permits a positive separation of the brazing material fillet 98 (of the brazed connection of Z ringframe 92 to the upper metalized surface 30 of ceramic substrate 22) on the one hand, and the laser weld 100 (comprising the hermetic seal between the cover 26 and the Z ringframe 92) on the other hand. This positive separation is accomplished by a channel 102 formed between the downturned ringframe lip 96 and outer surface 60 of substrate 22, which channel is used to isolate and segregate the brazing fillet 98.

FIG. 8 depicts a modified version of the Z ringframe configuration of FIG. 7. Here, the Z-shaped ringframe 92 is again brazed to ceramic substrate 22. However, the cover 26a has been modified to the extent that the downwardly extending cover lip portion 104 is significantly wider than the corresponding portion of ringframe 92 in FIG. 7. Thus, the outer surface 90a of cover 26a in this arrangement is purposely formed flush with the outer surface 106 of Z ringframe 92. Besides permitting a flush cover-to-ringframe arrangement, here again the laser seam weld 100 is physically removed from the brazing material fillet 98 which is formed and segregated within channel 102. By having the solder fillet 98 hidden, in effect, there is no potential for the solder material to contaminate the laser weld 100, or for the laser weld 100 to potentially compromise the lower ringframe-to-substrate solder joint.

It will be appreciated that each of the ringframe configurations of FIGS. 6–8 allow for positive self-centering of the cover 26 (and 26a) relative to the respective ringframe 86, 92.

FIG. 9 shows yet a further modified version of a ringframe of the present invention, here, namely a generally reverse L-shaped ringframe 108 (contrast to the L-shaped ringframe 86 of FIG. 6). This reverse L ringframe 108 is again brazed to surface 30 of substrate 22, and has a brazing fillet 98 formed and segregated in channel 102, the latter formed by the downwardly extending ringframe lip 110 of ringframe 108. As seen in FIG. 9, however, the outer edge of cover 26 is mounted flush to the outer surface 112 of ringframe lip 110. Further, the laser weld 100 is totally physically removed from the brazing material fillet 98 (hidden within channel 102). This specific design of reverse L-shaped ringframe 108 permits minimizing the actual ringframe's thickness, yet still presents a sufficiently thick ringframe edge (provided by ringframe lip 110) around the ringframe's outer perimeter. This ringframe design again helps shield the ceramic substrate 22 from the welding laser (not shown), as well as to protect the brazing material that forms brazing fillet 98 and the brazed sealed connection between ringframe 108 and ceramic substrate 22. In essence, this reverse L-shaped ringframe permits a much larger vertical edge thickness (due to ringframe lip 110) without affecting the electronic module package's overall thickness.

FIG. 10 depicts a different design of cover and ringframe arrangement than that as shown in FIG. 1, and provides the present invention's preferred embodiment of cover-to-ringframe seal joint. That is, in FIG. 10 is seen a ringframe 112 where three outer ringframe walls 36 are flush with the ceramic substrate edge wall, but the fourth ringframe wall has an extension end 113 that extends out over the end (see far left end in FIG. 10) of ceramic substrate 22. The cover 114 includes three edge walls 115, with a fiber feedthrough 116 being connected to the cover's fourth end wall 118, which end wall itself includes a lower extension wall portion 120. Leads 32 are again utilized to connect outside components to the electro-optical components (not shown in FIG.

10, but depicted generally as components 136 in FIG. 11), that are later used to populate the interior of this specific electronic module arrangement. Note that the lower extension wall portion 120 of end wall 118 extends down past the outer end wall 122 of extension end 113 of ringframe 112; its purpose is to allow the fiber feedthrough 116 to be positioned very close to the bottom edge of end wall 118 of the cover 114, yet still allow the laser welding to properly seal the cover 114 to ringframe 112. In effect, once the cover 114 is assembled and sealed to the ringframe 112, the cover 114 is formed to be flush to the ringframe 112 and outer edge of substrate 22 on three sides, and then cover 114, at wall 118 via extension portion 120, lips over and is sealed to the fourth end or side of ringframe 112.

This cover-to-ringframe arrangement and ringframe design of the embodiment of FIG. 10, is particularly useful when the cover 114 carries a fiber feedthrough 116. This is because, having the fiber feedthrough on the cover creates an obstacle and an interference to the later weld laser beam used to create the cover-to-ringframe laser seam. That is, the needed weld directly below the fiber feedthrough is virtually inaccessible to the weld laser, since the fiber feedthrough is so low and so close to that portion of the wall area. However, by extending the cover down farther, i.e., via cover wall extension 120, in FIG. 10, to wrap over the end of the ringframe, the laser can easily weld the joint along that feedthrough area. For example, in FIG. 10, if the weld laser started at the mid-point of the long visible edge of the cover and then went to the left in that Figure, once the weld laser gets to the end of ringframe 112, it makes a 90° turn downward, and then another 90° turn and wraps under the ringframe. At no point then does the weld laser have any interference from direct access to the solder joint (of ringframe-to-substrate) using this particular design; this benefit occurs because the ringframe extends out beyond the edge of its associated substrate. Thus, the present ringframe invention permits continued laser welding of cover-to-ringframe without interference due to the positioning of the fiber feedthrough or of the ringframe edges vis-a-vis the associated substrate.

Figure 11:
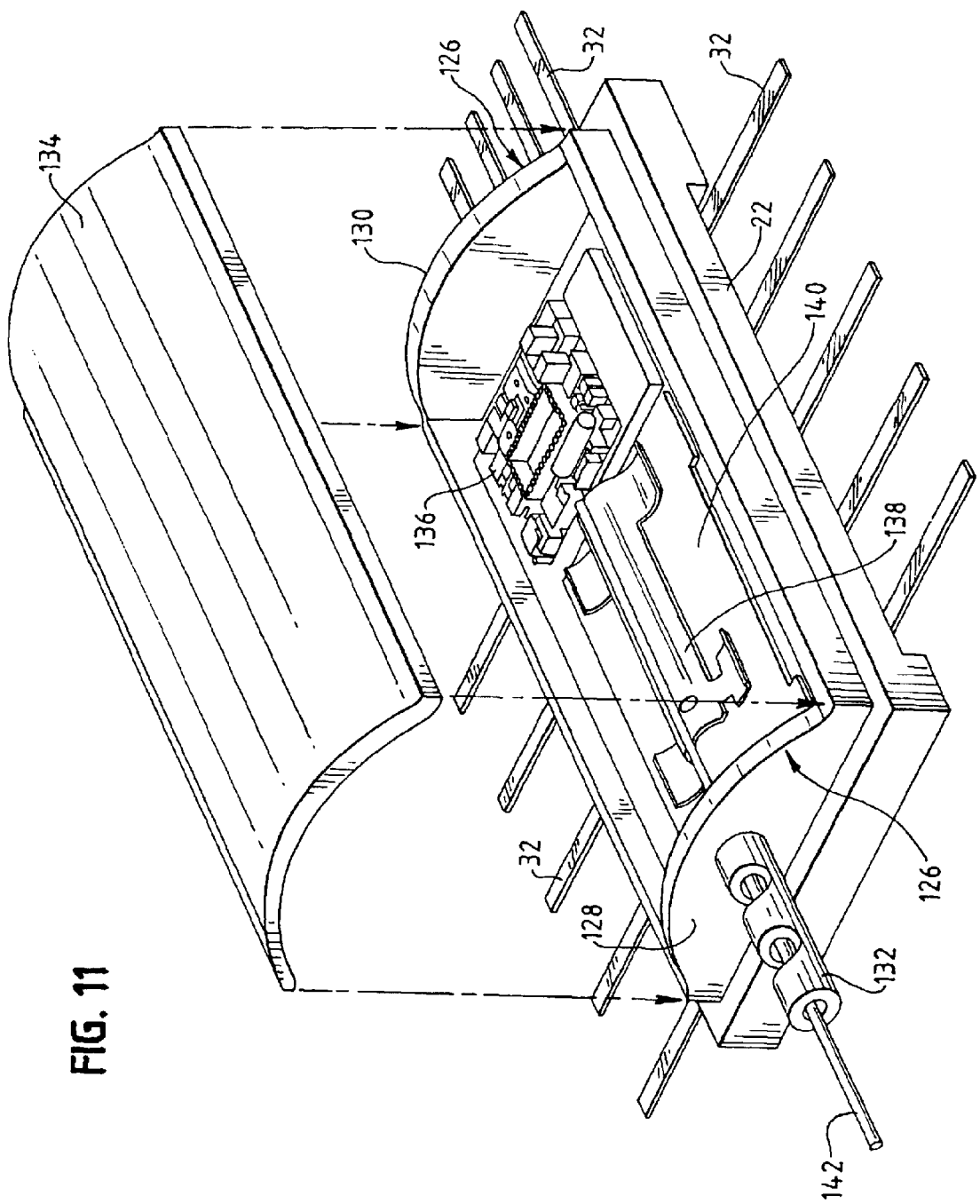
FIG. 11 is another exploded assembly view in perspective of a substrate with ringframe having arched end walls, one of which includes a fiber feedthrough.

In FIG. 11 is seen a specially-configured generally arched ringframe 126, as mounted on the ceramic substrate 22. That is, arched ringframe 126 has two arched end walls 128, 130 at opposite ends, with a fiber feedthrough 132 mounted to the arched end wall 128. That is, this arched ringframe design allows the fiber feedthrough 132 to be installed in an elevated end wall of the ringframe, rather than in the associated cover member 134. A mating arched cover 134 is then later hermetically sealed by an appropriate laser weld to the arched ringframe 126. Shown within the interior of the electronic module of FIG. 11 are various optical components, generated denoted by reference numeral 136, a flexure 138 mounted to a weld plate 140 in turn mounted to the ceramic substrate 22, and with the associated optical fiber 142 extending through the fiber feedthrough 132 and securely mounted to the flexure 138, and the fiber end all in proper alignment with the laser diode (not shown, but forming part of the optical/electronic components 136). Leads 32 are again used to connect the optical module of FIG. 11 to other electronic components as needed.

This arched ringframe design of FIG. 11, having the fiber feedthrough in a raised arched end wall of the ringframe, rather than in an end wall of the cover, is of great benefit during assembly of the components 136 and fiber 142. This is because the optical fiber can be assembled and fastened in place before the cover is installed, and unlike the designs where the feedthrough is on the cover, does not have to be maneuvered with the cover when it is placed in the ringframe when the later laser weld is made.

Turning to another aspect of the present invention, there is a method for preventing laser weld contamination of an existing ringframe-to-substrate seal joint, which might otherwise occur during the subsequent laser welding of a cover to a ringframe component when forming an electro-optical module package, as follows. First, an upper metallized surface is formed on the ceramic substrate. Then, a low profile ringframe is sealably fastened to the ceramic substrate by using a thin solder joint between the lower surface of the ringframe and the upper metallized surface on the substrate. Preferably, the ringframe has a sufficiently low profile, i.e., low height, to permit side viewing of the alignment of the associated optical fiber end with the optical component mounted to the substrate within the ringframe. Then, a cover member is positioned immediately over the upper surface of the ringframe, with the cover's member lower edge contacting the upper surface of the ringframe. Finally, the lower edge of the cover is laser welded to the upper surface of the ringframe. In one embodiment, when positioning the cover member immediately over the upper surface of the low profile ringframe, the cover member is formed to include a portion that extends horizontally beyond the low profile ringframe on at least one side thereof to facilitate hermetic sealing of the cover member to the ringframe. Further, when sealably fastening the low profile ringframe to the ceramic substrate, one can form the low profile ringframe to include an outer wall spaced inwardly from an outer edge of the ceramic substrate, at least on one side thereof. Further yet, when sealably fastening the ringframe to the ceramic substrate, one can form the ringframe to include an outer wall coextensive with an outer edge of the ceramic substrate on all sides thereof.

Further, one can impart an upwardly open edge channel along the length of the ringframe, and lay either a solder preform or a sealing edge strip into the bottom of that edge channel to help seal the cover to the low profile ringframe. Further still, one can segregate the ringframe-to-substrate seal joint within a channel formed between the outer edge of the ceramic substrate and a turned-down lip of an L-shaped low profile ringframe. Finally, one can form a channel on the lower outer corner edge of the low profile ringframe to cause the reflowed solder of the thin solder layer to wick along and stay within the channel.

Thus, as seen with the present invention, without the need for a costly separate enclosure, e.g., a butterfly package, a very low profile enclosure can be built up on a single ceramic substrate to create an enclosed electronic module package containing optical electronic components for telecommunication purposes. Other extra components, e.g., a secondary enclosure, such as a butterfly package, are eliminated with the present invention. The ringframe can be fastened to the ceramic substrate before component population occurs, but without impending later critical alignment operations. That is, due to the low profile of the side walls of the various arrangements of metal ringframes as disclosed herein, it is seen that the modules can be easily populated with electro-optical components, and the critical alignment of the metalized end of the optical fiber can still be achieved by computer-aided viewing of the same from both the side and top views. The present ringframe can be hermetically sealed to the ceramic substrate, and after appropriate population of the interior of the electronic module as formed by the ringframe, the final deep drawn or machined metal cover can be hermetically sealed to the ringframe, all so as to create a totally hermetically-sealed electronic module.

The present invention, thus, allows for the continued minaturization of electrical optical products, which is of great advantage and desire as the telecommunications industry strives for, and drives forward towards, ever smaller component packaging size. The ringframe of the present invention may be flat and planar, can be generally "L"-shaped, extending either up or down, or even generally "Z"-shaped, or even of an arch sharp, depending upon the desired resulting benefit. The various modified designs of ringframes of the present invention act to provide alternate ways to permit critical laser alignment after component population, yet also separate the later laser weld seal from the earlier solder seam seal. The present ringframe has structure to promote self-locating of the cover onto the ringframe, or self-locating of a solder preform. The present invention greatly improves sealing for hermiticity in modules, and further reduces the overall cost of optical module packaging and assembly through the use of a low profile ringframe approach, as distinct from the expensive and much larger butterfly packages of the prior art. The present invention also has the benefits of ease of assembly, better protection of the completed module, greatly, improved methods of sealing, and improved reliability for the module. Other components can be used with the ringframe designs of the present invention, such as heat sinks mounted to the underside of the ceramic substrate.

From the foregoing, it is believed that those skilled in the art will readily appreciate the unique features and advantages of the present invention over previous types of electro-optical module packages. Further, it is to be understood that while the present invention has been described in relation to a particular preferred embodiment and modified embodiments as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

What is claimed is:

1. A ringframe module package for hermetically enclosing an optical fiber end aligned with an optical component, the ringframe optical package comprising:
    a substrate member;
    a low profile ringframe comprising a continuous lower surface hermetically sealed to the substrate member, the low profile ringframe having an upwardly extending continuous side wall that terminates at a continuous upper surface;
    a cover member having a top plate and side walls extending to and hermetically sealed to the upper surface of the low profile ringframe, one of the side walls of the cover member comprising a fiber feedthrough having an axis parallel to the substrate, the axis being disposed above any portion of the side wall of ring frame to permit side viewing of alignment of the optical fiber end and the optical component.

2. The ringframe module package of claim 1, wherein the substrate comprising a ceramic substrate having a bottom wall, an upper metallized surface and a plurality of side walls, and wherein the bottom wall includes a lower recessed surface to receive a plurality of electronic leads extending beneath a plurality of different side walls of the substrate.

3. The ringframe module package of claim 2, the side wall of the low profile ringframe includes a continuous outer wall and a continuous inner wall, and the continuous upper surface of the ringframe is planar and the continuous lower surface of the ringframe is planar, the ring frame further having a generally rectangular cross-sectional configuration between the outer continuous wall and the continuous inner wall, and the lower planar surface disposed on the upper metalized surface of the ceramic substrate.

4. The ringframe module package of claim 2, wherein the low profile ringframe is brazed onto the upper metalized surface of the ceramic substrate by a thin solder layer.

5. The ringframe module package of claim 1, wherein the fiber feedthrough is downturned.

6. The ringframe module package of claim 1, wherein the cover is a metallic cover component.

7. The ringframe module package of claim 1, wherein the continuous upper surface of the low profile ringframe including an upwardly opening channel formed therein, the ringframe being soldered onto the upper metalized surface of the ceramic substrate, the side walls of the cover member being hermetically sealed in the upwardly opening channel of the ringframe.

8. The ringframe module package of claim 7, the channel including one of a solder preform and a sealing glass strip for accepting a lower peripheral edge of the side walls of the cover member in a hermetic seal.

9. The ringframe module package of claim 1, wherein the low profile ringframe is formed of KOVAR® material.

10. The ringframe module package of claim 9, wherein the cover is formed of KOVAR® material.

11. The ringframe module package of claim 1, wherein the low profile ringframe is formed with a solder-receiving channel formed along the outside lower peripheral edge of the sidewall of the ringframe, the channel adapted to receive reflowed solder when the ringframe is brazed to the substrate so as to substantially prevent formation of a solder fillet externally of the ringframe along the substrate.

12. The ringframe module package of claim 11, wherein the ringframe comprises a second solder-receiving channel formed along the inside lower peripheral edge of the side wall of the ringframe.

13. The ringframe module package of claim 1, wherein the low profile ringframe is substantially planar and substantially rectangular in cross section.

14. The ringframe module package of claim 1, wherein the low profile ringframe is generally L-shaped in cross section.

15. The ringframe module package of claim 14, wherein the L-shaped ringframe has its short "L" side formed on the inner peripheral edge thereof and extending upwardly.

16. The ringframe module package of claim 14, wherein the L-shaped ringframe has its short "L" side formed on the inner peripheral edge thereof.

17. The ringframe module package of claim 16, wherein the short "L" side is formed to extend downwardly, the outer edge of the substrate together with the downwardly-extending short "L" side creating a channel to segregate the hermetic seal of the low profile ringframe with the substrate from the hermetic seal of the low profile ringframe and the cover member.

18. The ringframe module package of claim 1, wherein the low profile ringframe is substantially Z-shaped in cross section.

19. The ringframe module package of claim 1, wherein the low profile ringframe is mounted to the substrate so an outer edge of the continuous side wall of the low profile ringframe being one of set in from, flush with, and extending out over an outer edge of the substrate.

20. The ringframe module package of claim 1, wherein at least one side wall of the cover member extends below the continuous upper surface of the low profile ringframe.

21. The ringframe module package of claim 1, wherein the hermetic seal of the cover member with the low profile ringframe member is formed by one of a sealing glass seal and a laser weld seal.

22. A method of preventing laser weld contamination of an existing ringframe-to-substrate seal joint, during subsequent laser welding of a cover to a ringframe, in forming an electro-optical module package, the method comprising:

forming an upper metalized surface on a ceramic substrate;

sealably fastening a low profile ringframe to the ceramic substrate using a thin solder layer between a lower surface of the ringframe ant the upper metallized surface, the low profile ringframe having an upwardly extending continuous side wall that terminates at continuous upper surface;

positioning a cover member immediately over the continuous upper surface of the ringframe, the cover member having a lower edge, a top plate and side walls, one of the side walls of the cover member comprising a fiber feedthrough having an axis; and laser welding the lower edge of the cover member to the upper surface of the ringframe so that the fiber feedthrough axis is parallel to the substrate and disposed above any portion of the side wall of ring frame to permit side viewing of alignment of the optical fiber end to the optical component during the positioning of the cover member.

23. The method of claim 22, wherein for positioning the cover member immediately over the upper surface of the low profile ringframe, forming the cover member to include a portion extending horizontally beyond the low profile ringframe on at least one side of the ringframe to facilitate hermetic sealing of the cover member to the ringframe.

24. The method of claim 22, wherein for sealably fastening the low profile ringframe to the ceramic substrate, forming the low profile ringframe to include an outer wall spaced inwardly from an outer edge of the ceramic substrate on at least one wide of the ceramic substrate.

25. The method of claim 22, wherein for sealably fastening the ringframe to the ceramic substrate, forming the ringframe to include an outer wall coextensive with an outer edge of the ceramic substrate on all sides of the ceramic substrate.

26. The method of claim 22, further comprising imparting an upwardly open etched channel along a length of the continuous upper surface of the ringframe; and laying one of a solder preform and a sealing glass strip into a bottom of the etched channel for sealing the cover to the low profile ringframe.

27. The method of claim 22, further comprising segregating the ringframe-to-substrate seal joint within a channel formed between the outer edge of the ceramic substrate and a down-turned lip of an L-shaped low profile ringframe.

28. The method of claim 22, further comprising forming a channel on the lower outer corner edge of the low profile ringframe to cause the reflowed solder of the thin solder layer to wick and stay within the channel.

29. A ringframe module package for hermetically enclosing an optical fiber end aligned with an optical component, the ringframe module package comprising:

a substrate member;

a low profile ringframe comprising a continuous lower surface hermetically sealed to the substrate member, the low profile ringframe comprising two side walls and two end walls that terminate at a continuous upper surface, the two end walls each including an upstanding arched wall having an outer wall surface, the outer wall surface of one of the end walls having a horizontally outwardly extending fiber feedthrough extending therethrough, the feedthrough capable of receiving and retaining at least one optical fiber extending therethrough, both side walls having a lower profile than the upstanding arched wall, the feedthrough having an axis parallel to the substrate and disposed above both side walls to permit viewing of alignment of the optical fiber end and the optical component;

a cover member having a top plate and side walls extending to and hermetically sealed to the upper surface of the low profile ringframe.

\* \* \* \* \*

UNITED STATES PATENT AND TRADEMARK OFFICE
CERTIFICATE OF CORRECTION

PATENT NO. : 6,821,032 B2 Page 1 of 1
DATED : November 23, 2004
INVENTOR(S) : Lake et al.

It is certified that error appears in the above-identified patent and that said Letters Patent is hereby corrected as shown below:

<u>Title page,</u>
Item [57], ABSTRACT,
Line 6, after "ringframe-to-" please delete "subtrate" and insert -- substrate -- in its place <u>Column 10,</u>
Line 49, please delete "inner" and insert -- outer -- in its place, and insert -- 50 -- in its place.

<u>Column 11,</u>
Line 14, after "ringframe" please delete "ant" and insert -- and -- in its place
Lines 16-17, after "that terminates" please delete "at continous" and insert -- at a continuous -- in its place.
Line 40, after "at lest one" please delete "wide" and insert -- side -- in its place.

Signed and Sealed this

Seventeenth Day of May, 2005

JON W. DUDAS
*Director of the United States Patent and Trademark Office*